United States Patent Office 2,713,050
Patented July 12, 1955

2,713,050

α-PHENYL-γ-(2-PYRIDYL)-BUTYRONITRILES

Lewis A. Walter, Madison, Richard H. Barry, Bloomfield, and John R. Clark, Nutley, N. J., assignors to Wallace & Tiernan Incorporated, Belleville, N. J., a corporation of Delaware No Drawing. Application August 27, 1953,
Serial No. 376,992

9 Claims. (Cl. 260—294.9)

This invention relates to new and useful organic compounds, namely, α-phenyl-γ-(2-pyridyl)-butyronitriles of the formula (1)

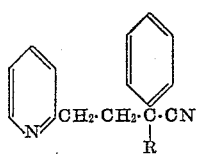

wherein R represents hydrogen, saturated lower alkyl radicals having from 1 to 6 carbon atoms, lower alkylene radicals, phenalkyl groups and phenyl.

The compounds of the present invention are useful as valuable intermediates in the preparation of useful pharmaceutical chemicals.

For example, the compounds of the present invention may be converted to the respectively corresponding carboxylic or butyric acids of the formula:

(2)

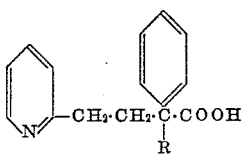

by processes such as are hereinafter disclosed in connection with several of the examples which follow. In these compounds R has the same meaning as given above in respect to the compounds of the present invention. These carboxylic or butyric acids form the subject matter of a co-pending application, Ser. No. 362,152, filed June 16, 1953, which is derived, as is the present application, from a common parent disclosure, Ser. No. 134,858, filed December 23, 1949, now abandoned, all these cases having the same inventors. In said application, Ser. No. 362,152, the uses of the compounds disclosed and claimed therein are stated, in that, such compounds are valuable chloretic compounds and are also useful as valuable intermediates for the production of other compounds which are valuable antispasmodics, such production being effected by converting the carboxyl group to an amide or ester group, followed by a reduction of the pyridine group to a piperidine group.

The compounds of the present invention may also serve as intermediates for the preparation of valuable compounds by a process illustrated by the following example:

Starting with the compound of the present invention and in which R is phenyl as in the formula for αα, diphenyl-γ-(2-pyridyl)-butyronitrile:

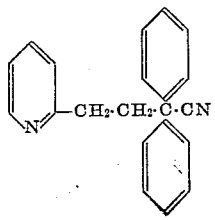

a 10% solution of this compound in benzene was refluxed with an equal molar quantity of methylsulfate for twenty-four hours. The resulting methyl sulfate salt was filtered off, dissolved in methanol, and hydrogenated at 100 atmospheres pressure with Raney nickel catalyst at a temperature preferably below 85° C. When this reaction was complete, the catalyst was filtered off and the methanol was distilled. The residue was dissolved in water and this solution was made strongly alkaline with excess sodium hydroxide. The oil which separated was extracted with ether, dried over anhydrous potassium carbonate, filtered, and the ether was distilled. The residue was the desired compound α,α, diphenyl-γ-(1-methyl-2-piperidyl)-butyronitrile having the formula:

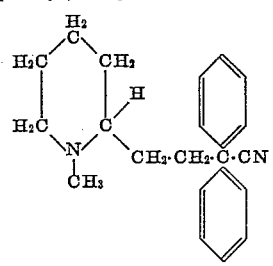

This compound is useful as an antispasmodic of the atropine type and further is useful as an intermediate for the production of other useful antispasmodics by conversions of the nitrile group thereof to amide, carboxyl, alkoxyl, urethane, keto, and amino methyl groups. This compound is more particularly described and claimed in another copending application of the present applicants, Ser. No. 217,056, filed March 22, 1951, now Patent No. 2,649,455, issued August 18, 1953.

Further, by the partial hydrolysis of the compound set forth in Ser. No. 217,056 in the manner specifically described in a further application of the present inventors, Ser. No. 297,406, filed July 5, 1952, now Patent No. 2,649,456, issued August 18, 1953, the compound α,α, diphenyl-γ-(N-methyl-2-piperidyl)-butyramide may be prepared. This compound has the formula:

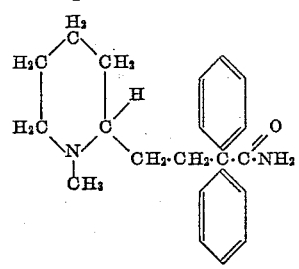

Said application, Ser. No. 297,406, now Patent No. 2,649,456, discloses and claims this compound and the acid addition and quaternary ammonium derivatives thereof and discloses the use of these compounds as valuable antispasmodics.

The compounds of the present invention are disclosed and claimed in applicants' copending application, Ser. No. 134,858 as aforesaid which is now abandoned in favor of this application and application, Serial No. 362,152. The present application supplies certain additional data as to the uses of the compounds disclosed and claimed therein, and thus constitutes a continuation-in-part of said application, Ser. No. 134,858, now abandoned.

The compounds of the present invention may be prepared by a process, which provides a means of introducing an amino group into phenyl acetonitriles without the use of the toxic amino alkyl halides (nitrogen mustard gases) commonly used. The carboxylic acids represented by the formula (2) above may be prepared from the corresponding butyronitriles represented by formula (1) above by hydrolysis, using strong acids as set forth in detail in the examples hereinafter given.

We have discovered that 2-vinylpyridine may be reacted under proper conditions with phenylacetonitriles in the presence of certain strongly basic catalysts to give α-phenyl-γ-(2-pyridyl)-butyronitriles in good yields.

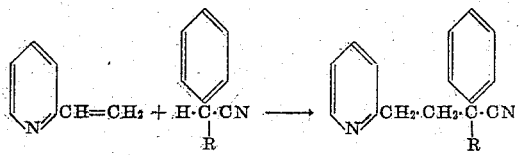

The following examples serve to illustrate our invention.

EXAMPLE I

*α-phenyl-γ-(2-pyridyl)-butyronitrile*

Four grams of sodium was dissolved in 400 ml. of absolute isopropanol and 200 g. of benzyl cyanide (phenyl acetonitrile) was added to the cold solution. It was well stirred and a solution of 190 g. of freshly distilled 2-vinyl-pyridine in 800 g. of benzyl cyanide was added. The flask was warmed gently and an exothermic reaction took place which caused the temperature to rise to about 55° to 60° C. After one hour at this temperature the mixture was heated on a steam bath for several hours.

One liter each of water and ether was added and the mixture was made just acid to litmus with acetic acid. The ether layer was separated, washed with water, and the basic materials were removed by extracting with two 500 ml. portions of 10% hydrochloric acid followed by two 200 ml. portions of water. The combined acid extracts were shaken with ether, to remove a little non-basic material and after separation they were made strongly basic with sodium hydroxide. The oil which separated was taken up in ether, washed with water and was then heated in a high vacuum at 100° C. to remove volatile impurities. The product so obtained weighed 350 to 375 g. and was a clear viscous oil which, except for the presence of a small amount of polymeric 2-vinylpyridine, was quite pure. The composition of the material was proved by the fact that it hydrolyzed readily with 50% sulfuric acid to give an excellent yield of α-phenyl-γ-(2-pyridyl)-butyric acid having the formula:

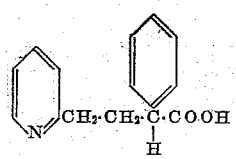

This compound was soluble in dilute acids and bases but was insoluble in water. It was crystallized from alcohol to give white crystals, M. P. 158° to 160° C. uncorrected. Neutralization equivalent (alkali): calculated—241; found—240.

EXAMPLE II

*α-phenyl-α-ethyl-γ-(2-pyridyl)-butyronitrile*

(a) One hundred grams of freshly distilled 2-vinyl-pyridine and 200 g. of α-phenyl-butyronitrile were refluxed for eight hours with a solution of 3 g. of sodium in 500 ml. of absolute isopropanol. The mixture was diluted with 500 ml. water and extracted with benzene. The benzene extracts were washed with water and the basic materials were then removed by extracting with three 150 ml. portions of 10% hydrochloric acid. The acid extracts were made strongly alkaline with sodium hydroxide solution and the oil which separated was taken up in benzene. This benzene extract was distilled in vacuo on a steam bath to recover 30 g. of 2-vinylpyridine. The residue was dissolved in 300 ml. dry benzene and treated with dry hydrogen chloride which precipitated 20 to 25 g. of polymeric vinylpyridine hydrochloride. This impurity was filtered off. The hydrochloride of the α-phenyl-α-ethyl-γ-(2-pyridyl)-butyronitrile was soluble in dry benzene. It was extracted with water and the free base was obtained by the addition of alkali. The 100 g. of product so obtained was a clear viscous oil, which was quite pure except for the presence of a little polymeric 2-vinylpyridine. This product was hydrolyzed to α-phenyl-α-ethyl-γ-(2-pyridyl)-butyric acid in good yield by heating it with 70% sulfuric acid at 150° C. for twelve to eighteen hours. This compound has the formula

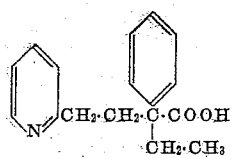

The white crystalline acid so obtained was soluble in dilute acids and bases but insoluble in water. It crystallized from alcohol and melted at 200° C. to 202° C. uncorrected. Neutralization equivalent (alkali): found—267; calculated—269.

(b) One gram of sodium amide was added to a solution of 25 g. of α-phenylbutyronitrile in 50 ml. of dry toluene. This mixture was stirred until the sodium amide dissolved and a solution of 20 g. of 2-vinylpyridine in 25 g. of α-phenylbutyronitrile was added. The mixture was slowly warmed to 100° C. and after several hours at that temperature, was worked up in the same manner as described in part (a) above to give α-phenyl-α-ethyl-γ-(2-pyridyl)-butyronitrile.

EXAMPLE III

*α-phenyl-α-n-butyl-γ-(2-pyridyl)-butyronitrile*

This compound was prepared from 117 g. of α-phenyl-capronitrile, 60 g. of 2-vinylpyridine and 400 ml. absolute isopropanol containing 4 g. of sodium using the same procedure used in Example II (a). The 85 g. of clear viscous product so obtained gave no crystalline salts, but was hydrolyzed to α-phenyl-α-n-butyl-γ-(2-pyridyl)-butyric acid in good yield as described in Example II. The acid so obtained melted at 201° C. to 203.5° C. uncorrected and was soluble in dilute acids and bases. Neutralization equivalent (alkali) calculated—297; found—296. This acid has the formula

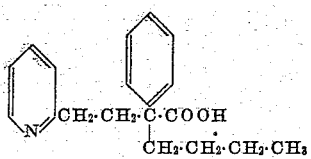

EXAMPLE IV

*α-phenyl-α-methyl-γ-(2-pyridyl)-butyronitrile*

This compound was prepared from 105 g. α-phenyl-propionitrile, 80 g. 2-vinyl-pyridine and 400 ml. absolute isopropanol containing 4 g. of sodium, using the same procedures as in Example II (a). The 115 g. of clear viscous product so obtained gave no crystalline salts, but was hydrolyzed to α-phenyl-α-methyl-γ-(2-pyridyl)-butyric acid in good yield as described in Example II (a). The acid so obtained melted at 149° C. to 152° C. uncorrected, was soluble in dilute acids and bases, and had a neutralization equivalent as actually determined of 254, as compared with the theoretical value, calculated—255. This acid has the formula

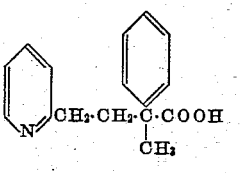

EXAMPLE V

*α-phenyl-α-benzyl-γ-(2-pyridyl)-butyronitrile*

Sixty-nine grams of benzyl-phenyl-phenylacetonitrile, 33.5 g. 2-vinylpyridine and 300 ml. absolute isopropanol in which 3 g. of sodium had been dissolved were refluxed for eight hours, then diluted with 300 ml. of water. The crystalline product which separated on cooling was filtered off and crystallized from methanol and found to have a melting point of 118° C. to 120° C. uncorrected.

This product was hydrolyzed with 70% sulfuric acid to α-phenyl-α-benzyl-γ-(2-pyridyl)-butyric acid, melting point 228° to 229° C. uncorrected. Neutralization eqivalent: calculated—331; found—332. This acid has the formula

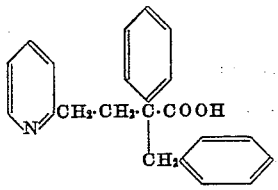

EXAMPLE VI

*α,α, diphenyl-γ-(2-pyridyl)-butyronitrile*

Two hundred grams of diphenyl acetonitrile, 100 g. of 2-vinylpyridine and 1500 ml. absolute isopropanol in which 10 g. of sodium had been dissolved were refluxed for eight hours, then diluted with 1500 ml. of water. The crystals which precipitated on cooling were filtered off and crystallized from methanol to give 190 g. of the desired product, having a melting point of 120° C. to 122° C.

This product was hydrolyzed with 70% sulfuric acid to α,α, diphenyl-γ-(2-pyridyl)-butyric acid, having a melting point with decomposition of 258° C. to 265° C. uncorrected. Neutralization equivalent: calculated—317; found—315. This acid has the formula

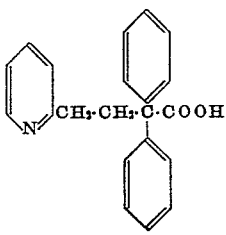

EXAMPLE VII

*α-phenyl-α-allyl-γ-(2-pyridyl)-butyronitrile*

Eighty grams of α-phenyl-α-allyl-acetonitrile, 50 g. of 2-vinylpyridine and 400 ml. of isopropanol in which 4 g. of sodium had been dissolved were refluxed for eight hours and the mixture was worked up as described in Example II (a). The product was a clear, slightly yellow oil, which was proven to be α-phenyl-α-allyl-γ-(2-pyridyl)-butyronitrile, by reactions described in Example VIII below.

EXAMPLE VIII

*α-phenyl-α-n-propyl-γ-(2-pyridyl)-butyronitrile*

Nineteen grams of the α-phenyl-α-allyl-γ-(2-pyridyl)-butyronitrile (produced as set forth in Example VII) was hydrogenated in alcohol with a palladium charcoal catalyst at room temperature. The theoretical amount of hydrogen necessary to saturate the double bond was absorbed in a few minutes and no further reduction took place. The catalyst was filtered off and the solvent was distilled to leave the α-phenyl-α-n-propyl-γ-(2-pyridyl)-butyronitrile as a light yellow oil. It was hydrolyzed with 70% sulfuric acid to give α-phenyl-α-n-propyl-γ-(2-pyridyl)-butyric acid, having a melting point of 205° C. to 207° C. uncorrected. Neutralization equivalent: calculated—283; found—284. The acid thus produced has the formula

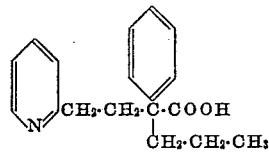

EXAMPLE IX

*α-phenyl-α-(β-methylallyl)-γ-(2-pyridyl)-butyronitrile*

Ninety-eight grams of α-phenyl-α-(β-methylallyl)-acetonitrile (prepared from sodio-benzyl cyanide and β-methyl allyl chloride by the conventional alkylation procedure), 60 g. of 2-vinylpyridine and 500 ml. of isopropanol in which 5 g. of sodium had been dissolved were refluxed for eight hours, then worked up as described in Example II (a). The 104 g. of clear, slightly yellow, oily product so obtained was characterized by hydrolysis with 70% sulfuric acid. The crude product was taken up in ether and extracted with dilute alkali. Acidification of the alkaline extract gave α-phenyl-α-(β-methylallyl)-γ-(2-pyridyl)-butyric acid, having a melting point of 173° C. to 176° C. Neutralization equivalent: calculated—295; found—303. The formula of this acid is

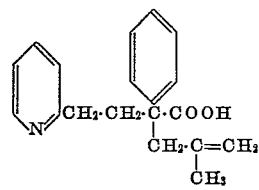

When this acid was dissolved in excess 5% alkali and boiled with charcoal for fifteen minutes, subsequent acidification of the filtered solution gave an acid having a melting point of 194° C. to 197° C., and a neutralization equivalent of 296, which may have been the result of a shift of the double bond.

There has been described hereinabove certain new compounds. The range of equivalents has been pointed out in respect thereto. A procedure for the making of various example compounds within the original general disclosure is also included. It is recognized that certain equivalents will occur to those skilled in the art from the foregoing particular description. All such equivalents as reasonably come within the scope of the appended claims are intended to be included in the purview thereof.

What is claimed is:

1. A compound of the class consisting of butyronitriles of the formula

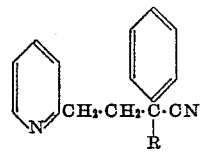

where R is selected from the group consisting of hydrogen, saturated lower alkyl radicals having from 1 to 6 carbon atoms, lower alkylene radicals, phenalkyl groups, and phenyl.

2. A compound according to claim 1 wherein R is a lower alkylene radical.

3. A compound according to claim 1 wherein R is a lower alkyl radical having from 1 to 6 carbon atoms.

4. A compound according to claim 1 wherein R is a phenalkyl group.

5. A compound having the formula
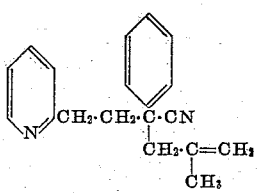
6. A compound having the formula
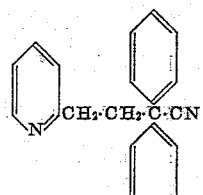
7. A compound having the formula
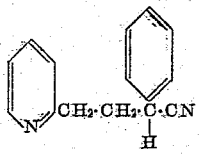
8. A compound having the formula
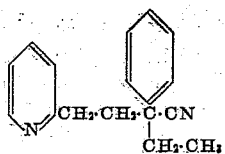
9. A compound having the formula
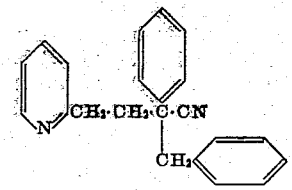
References Cited in the file of this patent
UNITED STATES PATENTS
2,507,631   Hartmann _____ May 16, 1950